United States Patent
Chen et al.

(10) Patent No.: US 10,521,417 B2
(45) Date of Patent: Dec. 31, 2019

(54) PROCESSING MUTATIONS FOR A REMOTE DATABASE

(71) Applicant: Google LLC, Mountain View, CA (US)

(72) Inventors: Jianjun Chen, Cupertino, CA (US); Alfred R. Fuller, San Carlos, CA (US); Steve Tsai, San Jose, CA (US)

(73) Assignee: Google LLC, Mountain View, CA (US)

( * ) Notice: Subject to any disclaimer, the term of this patent is extended or adjusted under 35 U.S.C. 154(b) by 278 days.

(21) Appl. No.: 14/748,642

(22) Filed: Jun. 24, 2015

(65) Prior Publication Data

US 2015/0370844 A1     Dec. 24, 2015

Related U.S. Application Data

(60) Provisional application No. 62/016,457, filed on Jun. 24, 2014.

(51) Int. Cl.
*G06F 16/27* (2019.01)
*G06F 16/23* (2019.01)
*G06F 16/2458* (2019.01)

(52) U.S. Cl.
CPC ...... *G06F 16/2365* (2019.01); *G06F 16/2329* (2019.01); *G06F 16/2358* (2019.01); *G06F 16/2474* (2019.01); *G06F 16/27* (2019.01)

(58) Field of Classification Search
CPC ......... G06F 17/30356; G06F 17/30575; G06F 17/30371
See application file for complete search history.

(56) References Cited

U.S. PATENT DOCUMENTS

| | | | |
|---|---|---|---|
| 6,192,365 B1 * | 2/2001 | Draper | G06F 9/466 707/648 |
| 7,483,882 B1 * | 1/2009 | Bumgarner | G06F 9/4493 |

(Continued)

FOREIGN PATENT DOCUMENTS

| CN | 101174204 A | 5/2008 |
|---|---|---|
| CN | 102436633 A | 5/2012 |

(Continued)

OTHER PUBLICATIONS

International Preliminary Report on Patentability in International Application No. PCT/US2015/037406, dated Jan. 5, 2017, 21 pages.

(Continued)

*Primary Examiner* — Usmaan Saeed
*Assistant Examiner* — David M Nafziger
(74) *Attorney, Agent, or Firm* — Fish & Richardson P.C.

(57) ABSTRACT

Methods, systems, and apparatus are described for processing mutations for a remote database. In one aspect, a method includes receiving a log of database mutations from a client device, the log of database mutations indicating changes previously made to a client version of a database stored on the client device, and each database mutation specifying: an entity included in the database; an operation for the entity; and a client version number for the entity; identifying, in the log of database mutations, two or more database mutations that each specify a same client version number for a same entity; determining, based on a conflict resolution policy, that the two or more database mutations are eligible for collapsing; and collapsing the two or more database mutations into a single database mutation.

18 Claims, 9 Drawing Sheets

(56) References Cited

U.S. PATENT DOCUMENTS

| | | | |
|---|---|---|---|
| 7,707,177 B2 | 4/2010 | Bank et al. | |
| 8,185,323 B1 | 5/2012 | Zhuo | |
| 8,635,271 B1* | 1/2014 | Adya | H04L 63/0807 |
| | | | 709/203 |
| 8,635,373 B1* | 1/2014 | Supramaniam | H04L 67/42 |
| | | | 709/248 |
| 8,700,569 B1* | 4/2014 | Wilson | G06F 16/214 |
| | | | 707/626 |
| 9,317,545 B2* | 4/2016 | Bailey | G06F 16/219 |
| 9,489,434 B1* | 11/2016 | Rath | G06F 16/25 |
| 9,552,407 B1* | 1/2017 | Hurst | G06F 16/275 |
| 2002/0035577 A1* | 3/2002 | Brodersen | G06F 16/278 |
| 2004/0054643 A1 | 3/2004 | Vemuri et al. | |
| 2004/0181291 A1* | 9/2004 | Plaisted | G06F 8/36 |
| | | | 700/1 |
| 2007/0067373 A1* | 3/2007 | Higgins | G06F 11/3013 |
| 2007/0283011 A1 | 12/2007 | Rakowski | |
| 2008/0104140 A1 | 5/2008 | Vierich | |
| 2008/0120129 A1* | 5/2008 | Seubert | G06Q 10/06 |
| | | | 705/35 |
| 2008/0120601 A1* | 5/2008 | Ashida | G06F 8/71 |
| | | | 717/124 |
| 2008/0140732 A1* | 6/2008 | Wilson | G06F 16/1873 |
| 2008/0183763 A1* | 7/2008 | Javalkar | G06F 16/275 |
| 2008/0195759 A1 | 8/2008 | Novik et al. | |
| 2009/0037445 A1* | 2/2009 | Ushiyama | H04L 67/104 |
| 2009/0157802 A1* | 6/2009 | Kang | G06F 16/275 |
| | | | 709/203 |
| 2009/0172201 A1* | 7/2009 | Carmel | H04L 67/104 |
| | | | 709/248 |
| 2009/0182707 A1 | 7/2009 | Kinyon et al. | |
| 2009/0259744 A1* | 10/2009 | Kolke | G06F 9/52 |
| | | | 709/224 |
| 2010/0076930 A1* | 3/2010 | Vosshall | G06F 3/0604 |
| | | | 707/638 |
| 2010/0205173 A1 | 8/2010 | Carnahan | |
| 2012/0117023 A1* | 5/2012 | Trog | G06N 5/022 |
| | | | 707/609 |
| 2012/0191679 A1* | 7/2012 | Takebe | G06F 16/2379 |
| | | | 707/703 |
| 2012/0330887 A1* | 12/2012 | Young | H04L 67/10 |
| | | | 707/610 |
| 2013/0006925 A1* | 1/2013 | Sawai | G06F 16/29 |
| | | | 707/609 |
| 2013/0064088 A1* | 3/2013 | Yu | H04L 45/38 |
| | | | 370/235 |
| 2013/0124638 A1* | 5/2013 | Barreto | G06F 15/16 |
| | | | 709/205 |
| 2013/0167120 A1* | 6/2013 | Amano | G06F 8/71 |
| | | | 717/122 |
| 2013/0173530 A1* | 7/2013 | Laron | G06F 16/1734 |
| | | | 707/608 |
| 2013/0227236 A1* | 8/2013 | Flynn | G11C 16/26 |
| | | | 711/165 |
| 2013/0268582 A1 | 10/2013 | Sitati et al. | |
| 2014/0040182 A1* | 2/2014 | Gilder | G06F 17/2264 |
| | | | 707/602 |
| 2014/0075112 A1* | 3/2014 | Baptist | G06F 3/0689 |
| | | | 711/114 |
| 2014/0089671 A1* | 3/2014 | Logue | H04L 63/0884 |
| | | | 713/182 |
| 2014/0095432 A1* | 4/2014 | Trumbull | G06F 16/213 |
| | | | 707/610 |
| 2014/0201145 A1* | 7/2014 | Dorman | G06F 16/27 |
| | | | 707/634 |
| 2014/0222758 A1* | 8/2014 | March | G06F 16/1873 |
| | | | 707/638 |
| 2014/0222793 A1* | 8/2014 | Sadkin | G06F 16/24578 |
| | | | 707/723 |
| 2014/0244581 A1* | 8/2014 | Rath | G06F 16/27 |
| | | | 707/623 |
| 2014/0258373 A1* | 9/2014 | Lerman | H04L 67/02 |
| | | | 709/203 |
| 2014/0258777 A1* | 9/2014 | Cheriton | G06F 11/1471 |
| | | | 714/19 |
| 2015/0012488 A1* | 1/2015 | van Rossum | G06F 11/00 |
| | | | 707/611 |
| 2015/0032982 A1* | 1/2015 | Talagala | G06F 16/178 |
| | | | 711/162 |
| 2015/0058556 A1 | 2/2015 | Hamedani | |
| 2015/0120663 A1* | 4/2015 | Le Scouarnec | G06F 16/178 |
| | | | 707/638 |
| 2015/0172412 A1* | 6/2015 | Escriva | G06F 9/466 |
| | | | 709/202 |
| 2015/0195221 A1* | 7/2015 | Rasmussen | H04L 51/04 |
| | | | 715/753 |
| 2015/0278323 A1* | 10/2015 | Melahn | G06F 16/178 |
| | | | 707/610 |
| 2016/0124993 A1* | 5/2016 | Watson | G06F 16/2365 |
| | | | 707/690 |
| 2017/0085653 A1* | 3/2017 | Meng | H04L 67/02 |
| 2017/0111172 A1* | 4/2017 | Sprenger | H04L 63/06 |
| 2017/0160933 A1* | 6/2017 | De Jong | G06F 9/467 |

FOREIGN PATENT DOCUMENTS

| | | |
|---|---|---|
| CN | 103294724 A | 9/2013 |
| CN | 103678494 A | 3/2014 |
| JP | H08-044611 A | 3/1996 |
| JP | 2002-244907 A | 8/2002 |
| JP | 2010-518520 A | 5/2010 |

OTHER PUBLICATIONS

Oracle "Oracle Streams," Jan. 31, 2008, pp. 1-249, Retrieved from the Internet: URL:https://docs.oracle.com/cd/B19306_01/server.102/b14229.pdf. [retrieved on Sep. 25, 2015].

International Search Report and Written Opinion in International Application No. PCT/US2015/037406, dated Dec. 15, 2015, 27 pages.

EP Office Action in European Application No. 15739083.2, dated Aug. 12, 2019, 9 pages.

* cited by examiner

PROCESSING MUTATIONS FOR A REMOTE DATABASE

CLAIM OF PRIORITY

This application claims priority under 35 USC § 119(e) to U.S. Patent Application Ser. No. 62/016,457, filed on Jun. 24, 2014, the entire contents of which are hereby incorporated by reference.

BACKGROUND

This specification relates to processing mutations for a remote database.

Databases are collections of data that are typically organized in a manner that supports processing the data included therein. Databases are often managed by database servers that facilitate access to and manipulation of data included in the databases by a database administrator and/or users of devices connected to the database server over a local or wide area network.

SUMMARY

In general, one innovative aspect of the subject matter described in this specification can be embodied in methods that include the actions of receiving a log of database mutations from a client device, the log of database mutations indicating changes previously made to a client version of a database stored on the client device, and each database mutation specifying: an entity included in the database; an operation for the entity; and a client version number for the entity; identifying, in the log of database mutations, two or more database mutations that each specify a same client version number for a same entity; determining, based on a conflict resolution policy, that the two or more database mutations are eligible for collapsing; and collapsing the two or more database mutations into a single database mutation. Other embodiments of this aspect include corresponding systems, apparatus, and computer programs, configured to perform the actions of the methods, encoded on computer storage devices.

These and other embodiments can each optionally include one or more of the following features. Determining, based on a conflict resolution policy, that the two or more database mutations are eligible for collapsing may comprise: identifying a first database mutations of the two or more database mutations that, based on the conflict resolution policy, would be applied to the remote database.

Collapsing the two or more database mutations may comprise: collapsing the first database mutation and each other database mutation of the two or more database mutations that occurs subsequent to the first database mutation into a single database mutation.

Collapsing the first database mutation and each other database mutation into a single database mutation may comprise collapsing, into the single database mutation, a most recent database mutation from the two or more database mutations that are eligible for collapsing.

Each of the two or more database mutations eligible for collapsing may specify the conflict resolution policy. The conflict resolution policy may be a default conflict resolution policy associated with the remote version of the database.

The operations may further comprise: for the single database mutation and for each other database mutation included in the log: querying a remote version of the database to identify a base version number for the entity specified by the mutation; determining whether the client version number for the entity matches the base version number for the entity; in response to determining that the client version number matches the base version number: performing, for the remote version of the database, the operation specified by the mutation; generating response data for the client device, the response data including an updated base version number for the entity; and in response to determining that the client version number does not match the base version number: determining, based on a conflict resolution policy, whether the operation specified by the mutation will be performed; performing, for the remote version of the database, the operation specified by the mutation only if it is determined that the operation specified by the mutation will be performed; and generating conflict response data for the client device, the conflict response data specifying whether the operation specified by the mutation was performed.

The conflict response data for the client device may include, for the entity specified by the mutation, a current version for the entity stored in the remote version of the database.

In general, another aspect of the subject matter described in this specification can be embodied in methods that include the actions of accessing a log of database mutations stored on a client device, the log of database mutations indicating changes previously made to a client version of a database stored on the client device, and each database mutation specifying: an entity included in the database; an operation for the entity; and a client version number for the entity; identifying, in the log of database mutations, two or more database mutations that each specify a same client version number for a same entity; determining, based on a conflict resolution policy, that the two or more database mutations are eligible for collapsing; and collapsing the two or more database mutations into a single database mutation. Other embodiments of this aspect include corresponding systems, apparatus, and computer programs, configured to perform the actions of the methods, encoded on computer storage devices.

These and other embodiments can each optionally include one or more of the following features. Determining, based on a conflict resolution policy, that the two or more database mutations are eligible for collapsing may comprise determining that an outcome of the operations specified by the two or more database mutations is independent from values stored for corresponding database entities on a remote version of the database.

Collapsing the two or more database mutations into a single database mutation may comprise collapsing, into the single database mutation, a most recent database mutation from the two or more database mutations that are eligible for collapsing.

Each of the two or more database mutations eligible for collapsing may specify the conflict resolution policy. The conflict resolution policy may be a default conflict resolution policy associated with the remote version of the database.

The operations may further comprise: providing a collapsed log of database mutations to a database server, the collapsed log of database mutations including each mutation in the log of database mutations that was not collapsed and the single database mutation.

In general, another aspect of the subject matter described in this specification can be embodied in methods that include the actions of receiving, from a client device, a request for updates to a client version of a database stored on the client device, the request including i) a client database version number for the client version of the database, and ii) a first cursor specifying a particular database entity included in the client version of the database; accessing a remote version of the database that is remote from the client device, the remote version of the database including a plurality of database entities, each database entity having a remote entity version assigned in a monotonically increasing manner across the plurality of database entities for the database; for each of a plurality of the database entities included in an ordered subset of database entities that begins with a database entity that matches the particular database entity: determining, based on a comparison of the remote entity version number of the database entity and the client database version number, whether the database entity has been updated; and for each database entity that has been updated, providing an entity update to the client device; and providing a remote database version number to the client device with at least one entity update, the remote database version number being a highest remote entity version number in the remote version of the database. Other embodiments of this aspect include corresponding systems, apparatus, and computer programs, configured to perform the actions of the methods, encoded on computer storage devices.

These and other embodiments can each optionally include one or more of the following features. The subset of database entities may not include every database entity in the remote version of the database. The subset of database entities may be dynamically determined based on one or more system constraints being met.

The one or more system constraints may include: a maximum processing time allowed for the request for updates; or a maximum update size allowed for the request for updates.

The operations may further comprise: receiving, from the client device, a second request for updates to the client version of the database, the second request including i) a second client database version number that matches the remote database version number that was provided to the client device with an entity update; and ii) a second cursor specifying a second database entity that is included in the client version of the database and that is ordered subsequent to a last database entity included in the ordered subset of database entities.

The operations may further comprise: updating a three dimensional table for the remote version of the database, the three dimensional table specifying every update to the remote version of the database that occurred within a predetermined period of time prior to a current time.

In general, another aspect of the subject matter described in this specification can be embodied in methods that include the actions of receiving, from a server device, a count of database entities included in a remote version of a database as of a specified version number; determining that the count of database entities is less than a client entity count that specifies a number of entities included in a client version of the database as of the specified version number; in response to determining that the count of database entities is less than the client entity count, sending, to the server device, a request for a list of keys for the database entities included in the remote version of the database; receiving, from the server device, a first proper subset of keys for a proper subset of the database entities included in the remote version of the database; and removing, from the client version of the database, any database entities that are within a corresponding proper subset of database entities included in the client version of the database and that have a key that is not included in the first proper subset of keys. Other embodiments of this aspect include corresponding systems, apparatus, and computer programs, configured to perform the actions of the methods, encoded on computer storage devices.

These and other embodiments can each optionally include one or more of the following features. The operations may further comprise: sending, to the server device, a second request for a second count of database entities included in a second subset of database entities that is different from the first subset of database entities, the second request specifying a second version number of the database; receiving, from the server device, the second count of database entities included in a corresponding second subset of database entities included in the remote version of the database as of the second version number; determining that the second count of database entities is less than a second client entity count that specifies a second number of entities included in the second subset of database entities client version of the database as of the second version number; sending, to the server device, a second request for a second list of keys for the database entities included in the second subset; receiving, from the server device, a third subset of keys for a third subset of the database entities included in the remote version of the database; and removing, from the client version of the database, any database entities that are within a subset of database entities included in the client version of the database that corresponds to the third subset and that have a key that is not included in the third subset of keys.

Particular embodiments of the subject matter described in this specification can be implemented so as to realize one or more of the following advantages. Client devices storing local copies of databases are able to keep the local copies updated and commit changes to the remote versions of the databases in a manner designed to reduce overhead for both client devices and database servers, while also reducing the risk of errors and false conflicts, and in situations where network communications between client devices and database servers may be frequently interrupted. Database servers and client devices need not store change logs or delete markers for databases, reducing the system resources required relative to other database management methods that use change logs and delete markers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
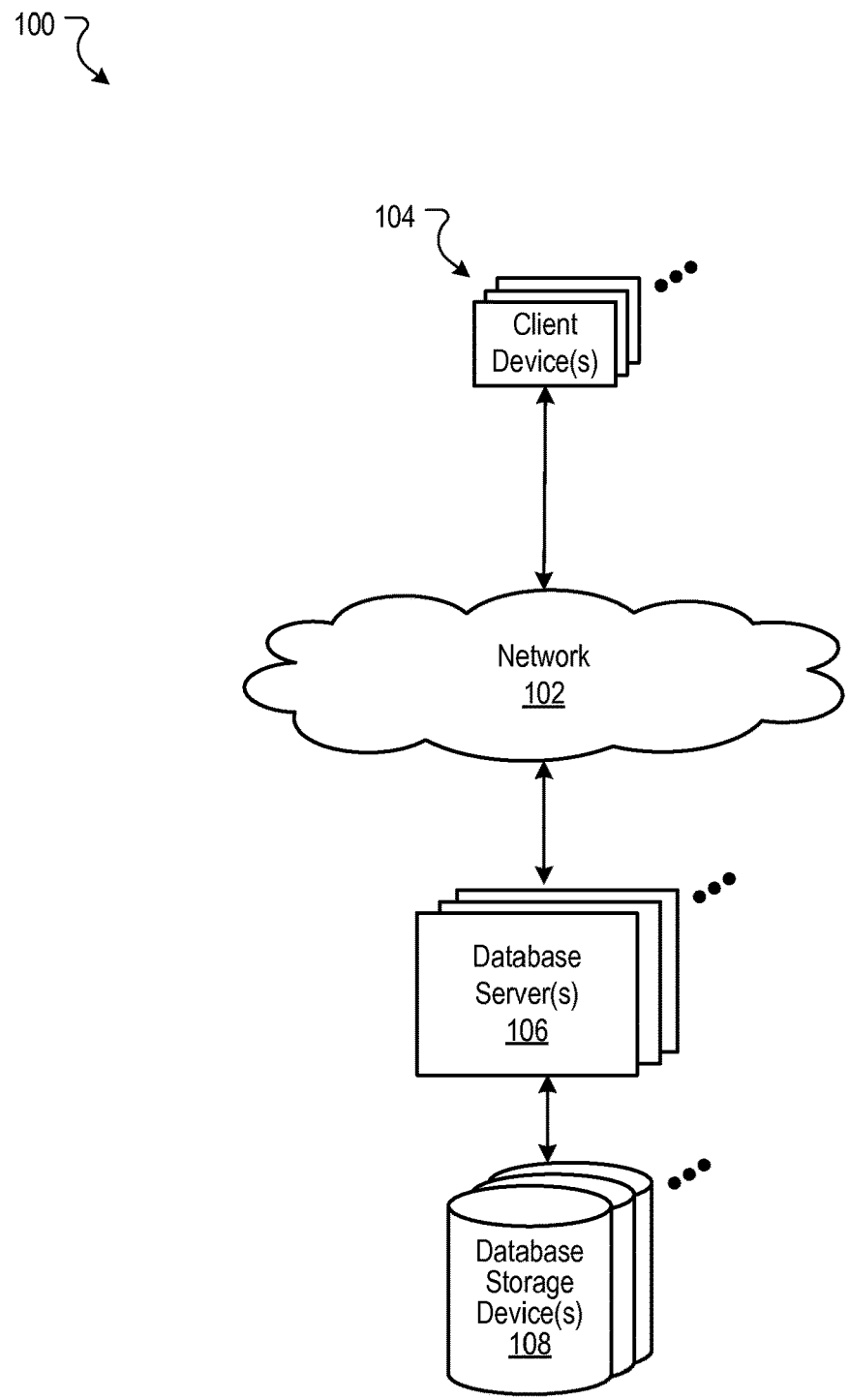
FIG. 1 is a block diagram of an example environment in which remote database mutations are processed.

When multiple client devices need access to data stored in a database, a remote database may be used to provide, for each client device, access to the same set of data. Client devices that frequently need access to data stored in a remote database may store a local copy the database on the client device which can be accessed without the need to communicate with a device hosting the remote database. For example, a remote database may be used to store a person's phone and email contacts. The user may use a laptop computer, a tablet computer, and a smart phone that all have access to the remote database that includes the users' contacts, and each of the users' devices may also store a local copy of the users' contacts. The local copy of the database may be used, for example, for quick access by the user device, and/or for access to the users' contacts when network communication with the remote database is not available. When the user makes a change, e.g., adds, edits, or deletes a contact in the local database, the client device on which the change occurs may update the remote database as well, so that the change to the database can be propagated to the local databases on the users' other devices using the remote database.

As another example, a remote database may be used to store nutritional information for various foods. A user may use an application included on a client device, such as a smart phone, to access the information included in the database, e.g., to track the user's daily nutrition intake. A local copy of the remote database may be useful, for example, to have access to the database when a network connection is slow or unavailable. A user may also update the local database, for example, by adding new foods and updating nutritional information for existing foods in the local database. When changes have been made to the local database, the client device and a database server may work together to synchronize the databases, e.g., by updating the remote database with the changes the user made locally and updating the local database with changes other users provided to the remote database.

Client devices and a database server facilitate database synchronization between a remote database and local copies of the database stored on the client devices. Database mutations applied to a local database by a client device may be collapsed, or merged, by the client device prior to providing the mutations to a database server to be committed, or applied, to the remote database. Collapsing mutations generally involves reducing the number of mutations by combining or merging mutations in a way that preserves the client's intent. Database mutations provided to the database server by a client device may be further collapsed prior to being committed to the remote database, saving time and computational resources while preserving the client's intent and ensuring idempotency. Responses to updates requested by a client device for a local database may be split into multiple requests and responses to preserve system resources and to reduce network communications load required for the requests and responses. Database entities deleted on a remote database can be synchronized with a local database without the need for change logs or delete markers.

For example, a client device may access a log of database mutations that were applied to a client version of a database stored on the client device. Each database mutation specifies a database entity, an operation for the entity, and a client version number for the entity. A database entity may also be referred to as a row or record included in the database. The client device identifies mutations for database entities that have the same version number and determines, based on a conflict resolution policy, whether the mutations can be collapsed. Some mutations identifying database entities with the same version number cannot be collapsed, e.g., if the outcome of a mutation depends on a value stored in the remote version of the database. After collapsing eligible mutations, the client device provides a collapsed log of database mutations to a database server for application to the remote version of the database.

The database server receives the log of database mutations from the client device and, if applicable, collapse database mutations specifying the same client version number that were not collapsed by the client device. As with the client device, the database server identifies mutations for database entities that have the same version number and determines, based on a conflict resolution policy, whether the mutations can be collapsed. The database server may check the remote database, as necessary, e.g., for database mutations that depend on a value stored in the remote version of the database. As noted above, collapsing database mutations may reduce the time and system resources needed to process the log of database mutations.

Idempotency may also be maintained for mutations, and in some implementations for other communications between client devices and database servers, without the need for explicit acknowledgements. For example, the most recent response sent from a database server to a client device may be saved, and upon receipt of a request with an identifier matching the saved response, the saved response may be provided without attempting to process the request that included the matching identifier.

To synchronize databases, a client device may send a request for updates to a database server. The request may include a client database version number and, in some implementations, a cursor indicating the entities for which updates are being sought. The database server provides the client device with updates for any entities that were updated since the client database version number provided with the client's request. To account for low client device bandwidth and other potential network issues, the database server may split the database updates into ranges of entities, providing the client device with updates in ranges.

In some implementations, the remote database does not keep a change log or use delete markers for deleted database entities. To synchronize deletes, a client device first compares a count of entities stored in the remote database to a local count of database entities. If there are more database entities in the local version of the database, the client device requests a list of keys for the entities currently in the remote database. Each key uniquely identifies an entity, and the client device compares the list of keys to the keys stored in the local database to find the entity or entities that were deleted from the remote database. As with synchronization requests, the database server may provide a partial list of entity keys, synchronizing deletes in ranges.

These features and additional features are described in more detail below.

Example Operating Environment

FIG. 1 is a block diagram of an example environment 100 in which remote database mutations are processed. A computer network 102, such as a local area network (LAN), wide area network (WAN), the Internet, or a combination thereof, connects one or more client devices 104 to one or more database servers 106 that are in communication with one or more database storage device(s) 108. In some implementations, the database server(s) 106 may be implemented in a distributed processing system that includes many data processors that can be used to manage databases stored in database storage devices connected, directly and/or indirectly, to the distributed processing system. Other system and network configurations may also be used to facilitate communication between client devices and database servers.

A database server 106 is an electronic device capable of managing the storage of data, e.g., in database storage devices 108. Example database servers include personal computers, server computers, and other devices that can send and receive data over the network 102. A database server 106 typically includes a database application used to manage data stored in databases and perform tasks, such as data analysis, storage, and manipulation. Other components may also be included in or in communication with the database server 106 to facilitate communication with client devices 104 and management of network communications, such as a load balancer or application server.

A client device 104 is an electronic device capable of requesting and receiving data over the network 102, including sending database mutations. Example client devices 104 include personal computers, mobile communication devices, and other devices that can send and receive data over the network 102. A client device 106 typically includes one or more applications that facilitate the sending and receiving of data over the network 102. For example, an application that stores application data remotely, e.g., in a database storage device 108, may have a client version of a database for the application, e.g., stored on the client device, as well as a remote version of the database that is accessible using a database server.

The database storage device(s) 108 store database data and metadata accessible to the database server(s) 106. Communication between the database server(s) 106 and database storage device(s) 108 may be, for example, any combination of direct communications, internal network communications, and/or communication across the network 102. A single database may be stored on one database storage device or across multiple database storage devices, and a single database storage device may store multiple databases.

Remote databases, e.g., databases stored remotely from client devices 104 in the database storage devices 108, may be periodically updated by the database servers 106. The database servers 106 may update databases as specified by database applications running on the database servers 106 and/or in response to receiving database mutations from client devices 104. For example, a client device may provide a database server with a log, or queue, of database mutations based on changes the client device made to the client's local copy of a database. The database server can use the log of database mutations to apply them to the remote version of the database stored on a database storage device.

The remote version of a database may be accessed and updated by many client devices, each with their own client version of the database. For example, an application may use a remote database to ensure that each client device that uses the application sees the same information. When one client device updates the remote database, a second client device will see the updates when it accesses the remote database at a later time. Various conflict resolution techniques, described in further detail below, are used to manage conflicts introduced when multiple client devices attempt to update the same piece of data in a database.

In some implementations, versioning may be used to assist in the resolution of potential conflicts when updating a database. Each entity stored in a database may have an associated version number, and each database may also have an associated version number. Entity version numbers may be assigned in a monotonically increasing fashion within the database, meaning that each database entity has a unique version number, and each subsequent mutation applied to each database entity causes the mutated database entity to be assigned an increased version number. In some implementations, database entity version numbers are only increased by database servers when the entities are inserted, updated, etc. The database version number may be specific to the device, client or server, and, in some implementations, be equal to the highest database entity version number in the respective client or server database.

Database versions, database entity versions, and conflict resolution policies may be used to resolve potential conflicts and prevent discrepancies between the client's version of a database and the remote version of the database. Conflicts and discrepancies between client databases and their respective remote databases may occur and be resolved during multiple different database operations, such as application of database mutations, synchronizing the client database, and when identifying deleted database entities. Conflict and discrepancy resolution during each of these database operations is described in further detail below.

Processing Database Mutations

Figure 2:
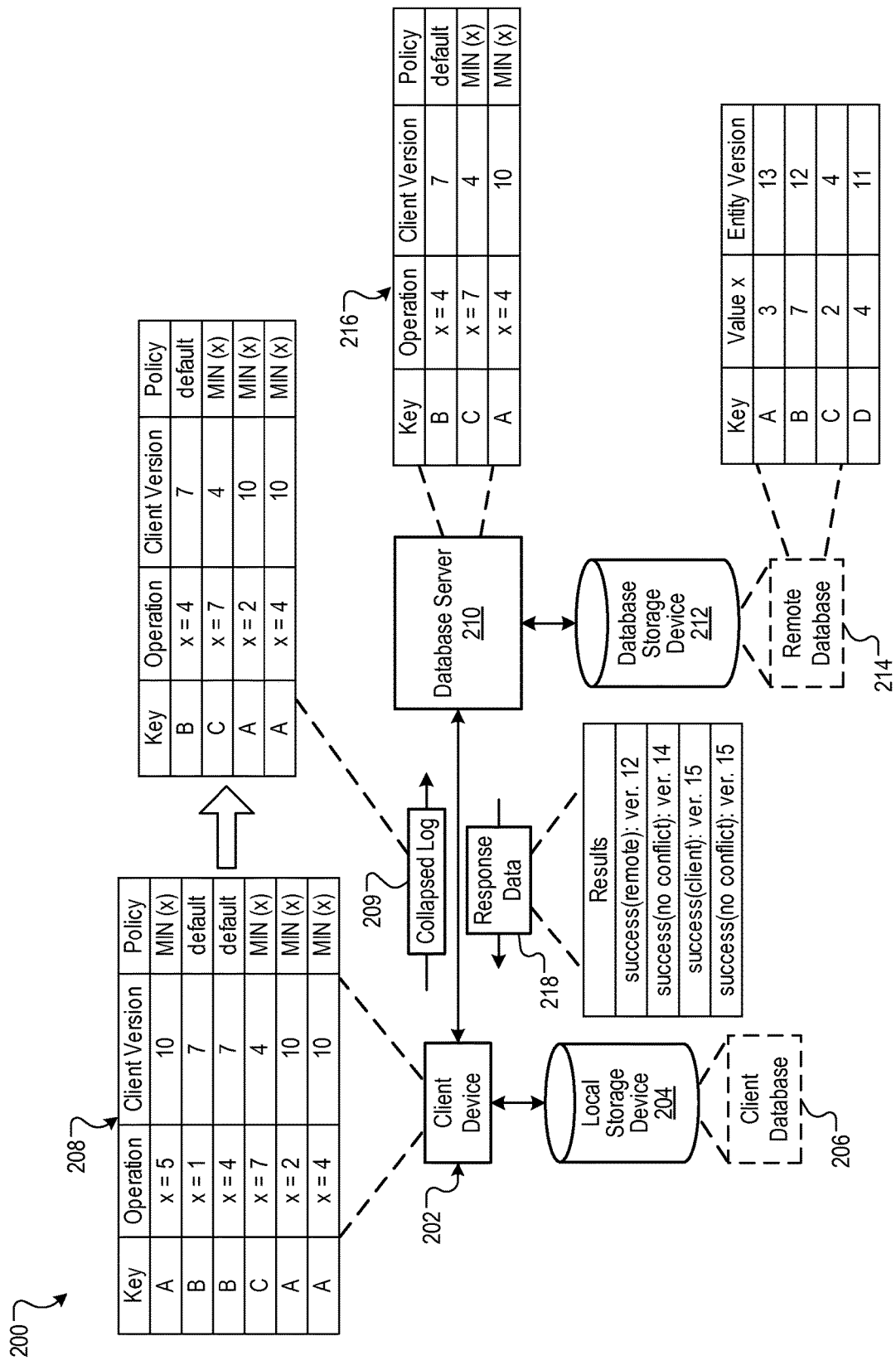
FIG. 2 is a data flow of an example process for handling remote database mutations.

FIG. 2 is a data flow of an example process 200 for handling remote database mutations. A client device 202 stores, in a local storage device 204, a client version of a database 206. The client device 202 may periodically apply database mutations to the client database 206. Database mutations are changes to entities stored in the database. For example, adding, removing, or updating database entities are each performed using a database mutation that specifies an entity included in the database, an operation for the entity, and a client version number for the entity.

An example log 208 of database mutations depicts a list of mutations that the client device 202 made to the client database 206. Each example mutation depicted in the log 208 specifies a key for an entity, an operation for the entity, a client version number, and a conflict resolution policy. For example, entity A has a value, x, that the client device first changed to 5. Later in the log 208, the client device 202 changed, for the same entity A, the value, x, to 2, then again to 4. For each mutation of the entity A, the conflict resolution policy is listed as "MIN(x)," which indicates that, in the event of a conflict, the minimum value for x will win.

In the example process 200, the database server 210 controls the version numbers of the entities in the database, and the database mutations that occur on the client device 202 do not result in changes to the version numbers for the database entities, e.g., while entity A has had three mutations applied to it in the client database 206, the version number remains the same (client version 10). The client device 202 determines which mutations in the log 208 may be collapsed, or merged, prior to providing them to the database server 210.

To determine which mutations may be collapsed, the client device 202 identifies two or more mutations in the log 208 that each specify the same client version number for the same entity. For example, the first, fifth, and sixth mutations are all for client version 10 of entity A. Using a conflict resolution policy, such as the policy specified in the log 208, the client device 202 determines whether the identified mutations can be collapsed. In some implementations, a default conflict resolution policy may be used. A default resolution policy may, for example, be a default policy for all databases stored at the database server 210 or a default policy specific to a particular database and stored with the particular database.

A conflict may arise, for example, when a client version number for an entity does not match a base version number for the entity in the remote database 214. When a conflict exists, the database server 210 uses a conflict resolution policy to determine whether the conflicting database mutation should be applied or not. Example conflict resolution policies include: remote—where the conflict will be resolved in favor of the remote database, client—where the conflict will be resolved in favor of the client device's mutation, MIN—where the conflict will be resolved by choosing a value that will result in the lowest value for an entity, and MAX, where the conflict will be resolved by choosing a value that will result in the highest value for an entity. The foregoing policies and the names of the policies are examples, and other policies, or names for the same policies, may be used.

The client device 202 may use a conflict resolution policy to determine whether database mutations are eligible to be collapsed. In some implementations, database mutations are eligible for collapsing if the outcome of the operations specified by the database mutations is independent from the values stored for corresponding database entities on the remote database 214. For example, database mutations having a conflict resolution policy of "remote" or "client" may be collapsed because conflict resolution using those policies does not depend on any value stored in the remote database 214. In other words, if the conflict resolution policy is "remote," a conflict will always resolve in favor of the value in the remote database, regardless of the value in the remote database 214, and the conflict resolution policy of "client" will always cause conflicts to resolve in favor of the client's mutations, regardless of the value stored in the remote database 214.

In some situations, the outcome of operations specified by the database mutations depends on a value stored in the remote database 214. For example, the fifth and sixth mutations in the log 208 specify two mutations for entity A: x=2 and x=4, and a conflict resolution policy of MIN(x). Database mutations provided by the client device 202 do not conflict with each other and would typically be applied in order, resulting in x being changed to 2, then to 4. However, because the remote database may store a value between 2 and 4, these two mutations may not be collapsed into a single database mutation, e.g., the most recent database mutation, of x=4.

By way of example, if the value for x in the remote database is 3, collapsing x=2 and x=4 into x=4, a conflict would result in x=3, because MIN (4, 3)=3. If the mutations were not collapsed, the end result would be x=4, because a conflict with the mutation, x=2, would result in MIN (2, 3)=2, and because multiple mutations from the same log do not conflict, the last mutation, x=4, would not conflict, resulting in x being changed from 2 to 4.

Conflict resolution policies are be resolved in a manner preserves the client's intent. The table below lists mutations that may be collapsed, given some example resolution policies. Each mutation is for the same database entity and version number. Each first mutation of the table includes an operation, A, and a conflict resolution policy. Each second mutation in the table also includes an operation, B, and a conflict resolution policy that may be collapsed with the first mutation. The resulting collapsed mutation is shown in the third column of the table.

| First Mutation | Second Mutation | Collapsed Mutation |
|---|---|---|
| Client(A) | <any policy>(B) | Client(B) |
| <any policy>(A) | Client(B) | Client(B) |
| Remote(A) | <any policy>(B) | <any policy>(B) |
| MIN(A) | MIN(B) | MIN(B) if MIN(A, B) = B |
| MAX(A) | MAX(B) | MAX(B) if MAX (A, B) = B |

For example, given a first mutation "Client(A)," any conflict, or no conflict, will resolve in favor of the client. After a mutation resolves in favor of the client, subsequent mutations cannot conflict, so no matter which policy is specified by the second mutation, the operation, B, will be performed. The collapsed result, preserving the intent of each mutation, is "Client(B)." Similarly, in a situation where the second mutation is "Client(B)," it makes no difference what the first operation or policy is, because any conflict, or no conflict, with the second mutation will resolve in favor of the client and operation B.

In the example process 200, the client device 202 has collapsed some of the mutations included in the log 208, resulting in a collapsed log 209 of database mutations. The client device 208 determines, for example, that the first and fifth mutations, those for entity A, are eligible to be collapsed into x=2, because x=5 followed by x=2 with a MIN(x) policy does not depend on the value of x stored in the remote database, e.g., MIN (5, 2)=2. As noted above, the sixth mutation, x=4 for entity A, cannot be merged, and remains a separate mutation in the collapsed log 209.

The second and third mutations included in the log 208 are for entity B, client version 7. The client device 202 determines that these mutations are eligible to be collapsed into x=4 based on the "default" conflict resolution policy, which may be stored on one or more of the client device 202, the client database 206, the database server 210 or the remote database 214. A default resolution policy of "remote," for example, would allow multiple mutations for the same version of the same entity to be collapsed into the last mutation, which in this example is x=4. The fourth mutation, for entity C, has not been collapsed because there is only one mutation for entity C in the log 208.

Different types of mutations may collapse in different ways. For example, the table below lists collapsed mutations for example INSERT, UPDATE, UPSERT, and DELETE database operations performed on the same entity. INSERT will insert a new entity or fail, UPDATE will update an existing entity or fail, UPSERT will insert a new entity or update an existing one, and DELETE will delete an entity if it exists. As indicated in the table of examples, a second INSERT will fail if the entity already exists as the result of a first INSERT, leading to a "<bad request>" as the collapsed mutation. A first mutation of INSERT(A) followed by UPDATE(B) can be collapsed into a single INSERT(B) mutation.

| First Mutation | Second Mutation | Collapsed Mutation |
|---|---|---|
| INSERT(A) | INSERT(B) | <bad request> |
| INSERT(A) | UPDATE(B) | INSERT(B) |
| INSERT(A) | UPSERT(B) | INSERT(B) |
| INSERT(A) | DELETE( ) | — |
| UPDATE(A) | INSERT(B) | <bad request> |

-continued

| First Mutation | Second Mutation | Collapsed Mutation |
|---|---|---|
| UPDATE(A) | UPDATE(B) | UPDATE(B) |
| UPDATE(A) | UPSERT(B) | UPDATE(B) |
| UPDATE(A) | DELETE( ) | — |
| UPSERT(A) | INSERT(B) | <bad request> |
| UPSERT(A) | UPDATE(B) | UPSERT(B) |
| UPSERT(A) | UPSERT(B) | UPSERT(B) |
| UPSERT(A) | DELETE( ) | DELETE( ) |
| DELETE( ) | INSERT(B) | UPSERT(B) |
| DELETE( ) | UPDATE(B) | <bad request> |
| DELETE( ) | UPSERT(B) | UPSERT(B) |
| DELETE( ) | DELETE( ) | DELETE( ) |

In the example process 200, the database server 210 receives the collapsed log 209 of database mutations. The database server 210 need not receive a collapsed log 209, and in some implementations, a log that has not been collapsed, e.g., log 208, may be received for processing by the database server 210.

The database server 210 identifies, in the collapsed log 209, database mutations that specify the same client version number and determines that those database mutations are eligible for collapsing. In some implementations, the database server 210 will collapse multiple mutations so that only one mutation for an entity is committed to the remote database 214, even if multiple mutations for the entity exist in the collapsed log 209.

In some implementations, the database server 210 determines that multiple database mutations for the same client version of the same entity are eligible for collapsing by identifying one mutation that, based on the conflict resolution policy, would be applied to the remote database 214. A database mutation would be applied to the remote database 214 if i) it did not cause a conflict, or ii) a conflict resolved in favor of the database mutation. As noted above, a conflict may arise when a database mutation received from a client device 202 specifies a client version number for an entity that does not match a base version number for the entity in the remote database 214. The database server 210 updates the base version number of an entity each time a mutation for the entity is applied to the remote database 214. In situations where the base version of an entity matches the client version number, no conflict exists. If, on the other hand, the base version of the entity does not match the client version number, a conflict will exists because a mutation, e.g., from another client device, has been applied to the remote database 214 prior to the application of the database mutations included in the collapsed log 209.

After identifying a mutation that would be applied to the remote database 214, all database mutations in the collapsed log 209 for that entity can be collapsed into a single database mutation. For example, all of the database mutations for an entity may be collapsed into the most recent database mutation for that entity when at least one of the mutations would be applied, because once an operation or conflict resolves in favor of a client provided mutation, the other mutations provided by the client device cannot conflict with each other and can be collapsed into the last mutation provided by the client for the corresponding entity.

In the example process 200, the third and fourth mutations of the collapsed log 209 specify client version 10 of entity A. In situations where the database server 210 determines that the third operation, x=2, would be applied, that mutation may be collapsed into the fourth mutation, x=4, because the fourth mutation was subsequent to the third mutation and cannot conflict with the third mutation. By way of example, the client version number for entity A in the collapsed log 209 is 10. The base version for the entity A in the remote database 214 is 13. A conflict arises because the version numbers do not match, e.g., as a result of entity A being previously updated by the database server 210. The conflict resolution policy of MIN(x) causes the conflict to resolve in favor of the third mutation, x=2, because 2 is less than the value for x stored in the remote database, 3. Because the third mutation would be applied to the remote database 214, any subsequent mutations would also be applied, which allows the database server 210 to collapse all of the mutations for entity A into a single mutation.

In situations where no mutations for an entity would be applied, e.g., multiple mutations for an entity that cause a conflict that always resolves in favor of the remote database value, the database server 210 may collapse all database mutations for the entity into a single mutation in a manner similar to that described above. In some implementations, the mutations that would not be applied may be removed from a list of database operations, and the database server 210 will not attempt to commit them to the remote database 214.

In the example process 200, the second collapsed log 216 depicts the mutations after they have been collapsed by the database server 210. No further collapsing is necessary for the first and second mutations, for entities B and C, respectively, because they are the only mutations for those entities that were included in the collapsed log 209.

When committing mutations to the remote database 214, the database server 210 checks the client version numbers of the database mutations, or collapsed mutations, as applicable, against the base version for the corresponding entities in the remote database 214. In situations where the client version number specified by a database mutation matches the base version number, there is no conflict, and the database mutation may be applied to the remote database 214. For example, the mutation for entity C in the collapsed log 216 specifies a client version number of 4 and the operation, x=7. The database server compares the client version number (4) to the base version number (4) stored in the remote database 214 and, finding a match, determines that the operation, x=7, may be applied, changing the value of x from 2 to 7 in the remote database.

The mutation specifying entity B in the collapsed log 216 has a client version of 7 which, when compared to the base entity version (12) stored in the remote database 214, results in a conflict. The mutation does not specify a conflict resolution policy, and resolution of the conflict will be performed according to the database server 210 default or, in situations where it is defined, the remote database 214 default. For example, with a default resolution policy of "remote," the conflicting mutation would not be applied, while a default resolution policy of "client" would result in the database server 210 applying the conflicting mutation.

The third mutation of the collapsed log 216 specifies client version 10 of entity A and the operation, x=4. The database server 210 previously determined that this collapsed mutation would be applied to the remote database 214, so the operation x=2 is applied to the remote database 214.

When the database server 210 applies a mutation to the remote database 214, the base entity version for the affected entity may also be updated in the remote database 214. For example, entities A and C were updated in the above example and, when assigning version numbers in a monotonically increasing manner, the base version of entity C may be updated from 4 to 14, and the base version of entity A may be updated from 13 to 15. While the foregoing example increases the base version number by 1, other amounts that also preserve the order in which entities are updated may be used to increase the base version number. As another example, a timestamp may be used to ensure that version numbers are always increasing.

The database server 210 provides response data 218 to the client device 202 after processing the database mutations. The response data 218 may include information related to the results of the database mutations. For example, the response data 218 may include, for entities that were updated, a new version number for the entity that matches the base version number in the remote database 214. The response data 218 may also include an indication of success or failure, where success indicates that the mutations was received and processed—but not necessarily applied to the remote database, and failure indicates that the mutations were either not received or not processed by the database server 210. In the example process 200, the response data 218 indicates, for each database mutation included in the collapsed log 209 sent to the database server 210, an indication of success or failure in the processing of the mutation, a result of attempted application of the mutation, and the base version number of the corresponding entity. In some implementations, a current value may also be provided, e.g., the results 218 may indicate that entity B has a value of 7 in the remote database 214. In some implementations, values are not provided with the results 218, and the client device 202 obtains updates through a separate query, or update request.

The client device 202 may use the response data 218 to determine whether or not the mutations provided in the log 208 were successfully received, processed, and applied. If successful, the client device 202 may update the version number of the corresponding entity in the client database 206 to reflect the new base version provided in the response data. If unsuccessful, the client device 202 may send a new mutation, or request the current data for the corresponding entity from the remote database 214, e.g., in an update request.

In some implementations, the database server and client device may operate in a manner designed to ensure idempotency of database mutations, and in some implementations other communications or instructions received by the database server. For example, instructions sent to the database server may have a request identifier provided by the client device. When the database server responds to a request from the client device, the database server may store the response and associate it with the request identifier. In situations where the client device receives the response, any subsequent request will be assigned a new request identifier. When the database server receives a request with a new identifier, the new identifier acts as an acknowledgement to the database server that the previously provided response was received by the client device. In situations where the client device does not receive the response, the client device may retry the request using the same request identifier. The same request identifier is used even in situations where the client device changes the request. When the database server receives the request with a request identifier matching the most recently provided response, the database server takes no action on the new request and instead provides the client device with the previous response. The response data, when received by the client device, indicates to the client device which request actually succeeded.

Figure 3A:
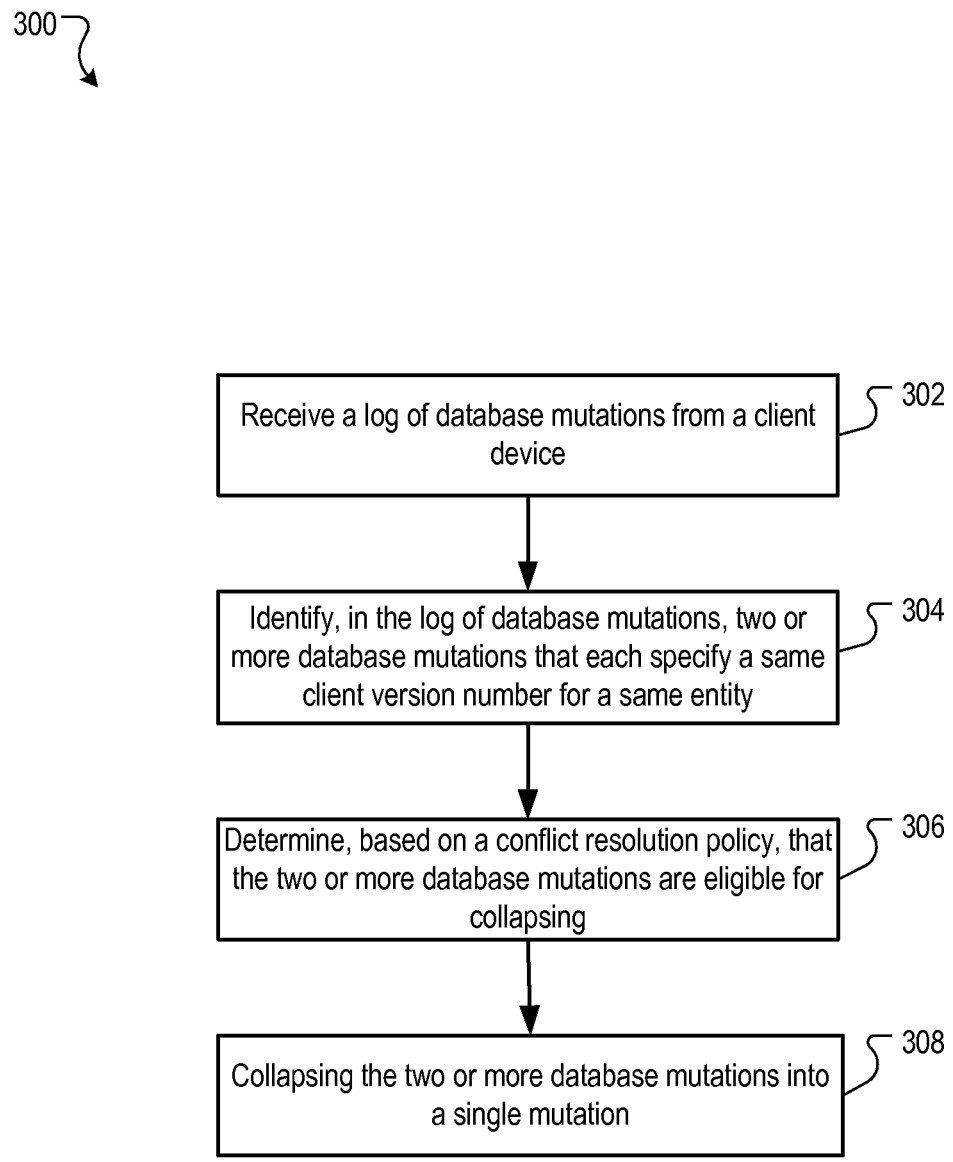
FIG. 3A is a flow diagram of an example process for handling remote database mutations.
Figure 3B:
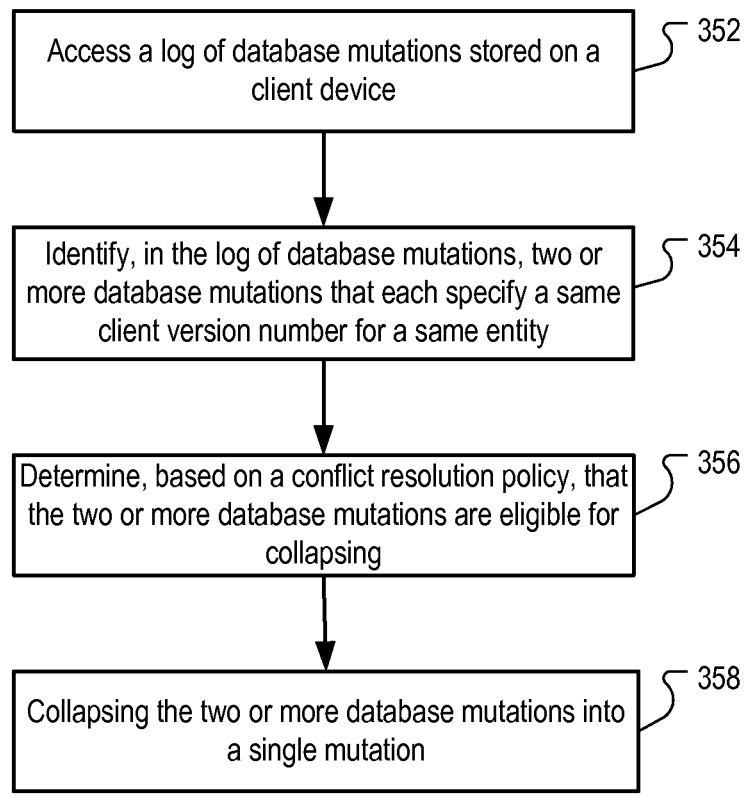
FIG. 3B is a flow diagram of an example process for providing remote database mutations.

Some portions of the example process 200 may be performed by a client device 202, while other portions of the example process 200 may be performed by a database server 210. FIGS. 3A and 3B each describe an example process from a different point of view. The example process described in FIG. 3A may be performed by a server device, while the example process described in FIG. 3B may be performed by a client device.

Turning now to FIG. 3A: FIG. 3A is a flow diagram of an example process 300 for handling remote database mutations. The process 300 may be performed by data processing apparatus, such as a database server described above.

A log of database mutations is received from a client device (302). The log of database mutations indicates changes previously made to a client version of a database stored on the client device. Each database mutation specifies: an entity included in the database, an operation for the entity, and a client version number for the entity. The log of mutations may include any number of mutations for any number of entities.

Two or more database mutations are identified, in the log of database mutations, that each specify a same client version number for a same entity (304). For example, the log of database mutations may include five different mutations for a single entity, and each of the five mutations specifies the same client version number for that entity.

The process 300 determines, based on a conflict resolution policy, that the two or more database mutations are eligible for collapsing (306). In some implementations, determining that the two or more database mutations are eligible for collapsing includes: identifying a first database mutation of the two or more database mutations that, based on the conflict resolution policy, would be applied to the remote database. For example, if there are five different database mutations for the same entity, the database server may determine that they are eligible for collapsing as long as one of the database mutations would be applied to the remote database. To determine whether the database mutation would be applied to the remote database, the database server may, for example: check first for a conflict, and if no conflict, the mutation would be applied; and if there is a conflict, check to see if the conflict would be resolved in favor of the database mutation or the current remote database value.

In some implementations, two or more database mutations are eligible for collapsing if none of the database mutations would be applied to the remote database. For example, in a situation involving a conflict, and a conflict resolution policy favoring the value in the remote database, it may be determined that the database mutations are eligible for collapsing. In some implementations, each of the two or more database mutations eligible for collapsing specify the conflict resolution policy. In some implementations, the conflict resolution policy is a default conflict resolution policy associated with the remote version of the database.

The two or more database mutations are collapsed into a single mutation (308). In some implementations, collapsing the two or more database mutations includes collapsing the first database mutation and each other database mutation of the two or more database mutations that occurs subsequent to the first database mutation into a single database mutation. For example, in a situation with five database mutations that are eligible for collapsing, all five database mutations may be collapsed into a single database mutation. In some implementations, the single database mutation is a most recent database mutation from the two or more database mutations that are eligible for collapsing.

In some implementations, the process 300 includes, for the single database mutation and each other database mutation included in the log, querying a remote version of the database to identify a base version number for the entity specified by the mutation. For example, a base version number for the entity may be a database server supplied timestamp specifying the date and time of the most recent update to the entity in the remote database. The database server may then determine whether the client version number for the entity matches the base version number for the entity.

In response to determining that the client version number matches the base version number, the database server may perform, for the remote version of the database, the operation specified by the mutation and generate response data for the client device that includes an updated base version number for the entity. For example, if a database mutation, collapsed or otherwise, has a client database version number that matches the base version of the entity stored in the remote database, the mutation can be applied because there is no conflict, e.g., the entity has not been updated since the client device last received or provided an update for the entity.

In response to determining that the client version number does not match the base version number, the database server may determine, based on a conflict resolution policy, whether the operation specified by the mutation will be performed and, only if it is determined that the operation will be performed, perform the operation and generate conflict response data for the client device that specifies whether the operation specified by the mutation was performed. Conflict resolution policies include, for example, policies where conflicts will always resolve in favor of the client, will always resolve in favor of the remote database value, will resolve in favor of a particular result, etc.

In some implementations, the conflict response data includes, for the entity specified by the mutation, a current version for the entity stored in the remote version of the database. For example, if a database mutation conflicted, and the conflict resolved in favor of the remote database value, the remote database value and version number may be provided to the client device.

FIG. 3B is a flow diagram of an example process 350 for providing remote database mutations. As noted above, the process 350 may be performed by data processing apparatus, such as a client device described above.

A log of database mutations stored on a client device are accessed (352), e.g., by the client device. The log of database mutations indicates changes previously made to a client version of a database stored on the client device. Each database mutation specifies: an entity included in the database, an operation for the entity, and a client version number for the entity. The log of mutations may include any number of mutations for any number of entities.

Two or more database mutations are identified, in the log of database mutations, that each specify a same client version number for a same entity (354). For example, the log of database mutations may include five different mutations for a single entity, and each of the five mutations specifies the same client version number for that entity.

The process 300 determines, based on a conflict resolution policy, that the two or more database mutations are eligible for collapsing (356). In some implementations, determining that the two or more database mutations are eligible for collapsing includes: determining that an outcome of the operations specified by the two or more database mutations is independent from values stored for corresponding database entities on a remote version of the database. For example, a conflict resolution policy specifying that conflicts will resolve in favor of the client does not depend on what value is stored in the remote database for that entity, which means that the corresponding mutations are eligible for collapsing. Similarly, a conflict resolution policy specifying that conflicts will resolve in favor of the remote database also does not depend on the value stored in the remote database for that entity, because the remote value will stay the same no matter what it is.

In some implementations, each of the two or more database mutations eligible for collapsing specify the conflict resolution policy. In some implementations, the conflict resolution policy is a default conflict resolution policy associated with the remote version of the database.

The two or more database mutations are collapsed into a single mutation (308). In some implementations, collapsing the two or more database mutations into a single database mutation includes collapsing, into the single database mutation, a most recent database mutation from the two or more database mutations that are eligible for collapsing. For example, in a situation with 5 database mutations that are eligible for collapsing, all five database mutations may be collapsed into the single most recent database mutation.

In some implementations, the process 350 further includes providing a collapsed log of database mutations to a database server, the collapsed log of database mutations including each mutation in the log of database mutations that was not collapsed and the single database mutation. In some implementations, the collapsed log may include multiple mutations that were collapsed into single mutations.

Synchronizing Remote and Local Databases

Figure 4:
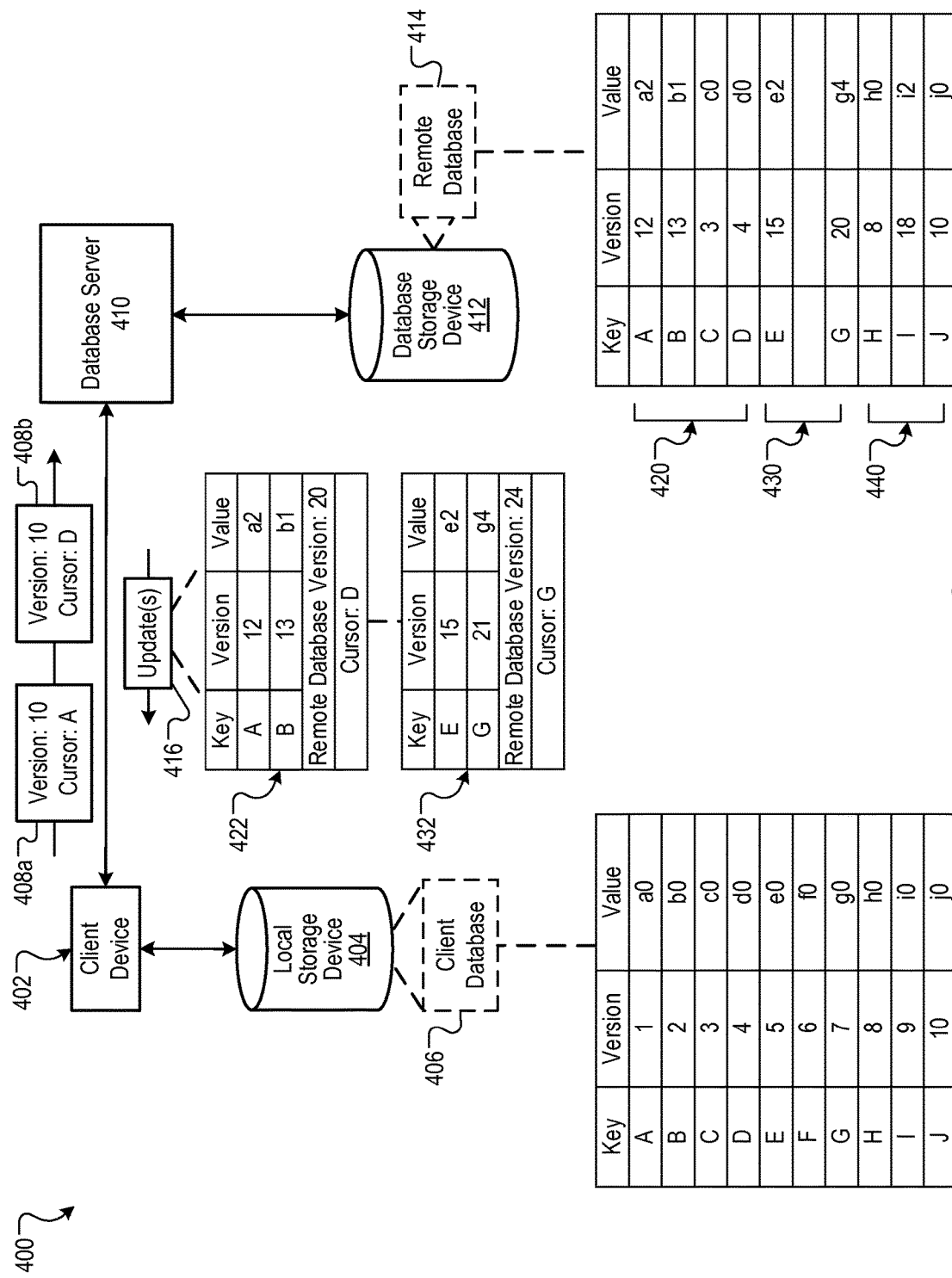
FIG. 4 is a data flow of an example process for synchronizing databases.

FIG. 4 is a data flow of an example process 400 for synchronizing databases. In the example process, the client device 402 stores, in a local storage device 404, a client database 406. The client database 406 is a local copy of the remote database 414 stored in a database storage device 412 accessible to a database server 410. In situations where other client devices make changes to the remote database 414, these changes may not be automatically provided to the client device 402, e.g., if the client device 402 is turned off or does not otherwise have access to the database server 410.

The client device 402 may periodically send requests for updates, or synchronization requests, to the database server 410. Each request, e.g., 408a and 408b, includes a client database version number and may also include a cursor for the database. In some implementations, the client database version number is equal to the highest entity version number in the client database 406. In the example data flow 400, the highest entity version number is 10, which is sent to the database server 410 in the first request 408a. The cursor is a logical position that indicates a particular database entity that will serve as the starting point for receiving updates. In the example data flow 400, the cursor specified by the first request 408a specifies the first database entity of the client database, entity A. In some implementations, a cursor is not specified in a request, in which case the database server 410 may begin checking for updates from the first entity.

The database server 410 processes the update request 408a by accessing the remote database 414 and, starting with the entity that corresponds to the cursor, checks to see if the entity has been updated. In situations where database entity version numbers are assigned in a monotonically increasing manner, any database entity with a version number higher than the client database version number provided in the request 408a has been updated, while any database entity with a version number equal to or less than the client database version number has not been updated. In the example data flow 400, the entities corresponding to keys 1, 2, 5, 7, and 9 have all been updated.

For each database entity that has been updated, the database server 410 provides the client device 402 with data that specifies the updated entity, the value(s) that was/were updated, and the version number of the entity in the remote database 414. For example, one of the updates 416 included in the example process 400, the first update 422, includes an update to entity A. The update 422 specifies the remote database version number for the entity, 12, and the updated value, a2.

In some implementations, the database server 410 does not check for and provide updates of the entire remote database 414, but instead checks for and provides updates for a subset, or proper subset, of the database entities. The subset of database entities for which updates are provided may depend, for example upon a particular system constraint specified by the remote database 414 and/or the database server 410. Example system constraints include a maximum processing time, and/or a maximum update size, etc. In situations where client devices 402 do not have fast and/or reliable network access, limiting the amount of time to process a request and the amount of data included in an update may help prevent loss of data and/or inconsistencies. In addition, databases including a high volume of data may take a long period of time to check for updates, during which time a backlog of database mutations may accrue. The likelihood of other problems occurring, such as conflicts created by entities that were changed after being checked for updates but before the update response was sent to the client device 402, may be reduced using system constraints to process requests and provide updates for subsets of database entities.

In the example process 400, the first subset 420 of entities that the database server checked for updates includes the entities specified by keys A-D. For example, the database server 410 may have checked four of the database records for updates before a time limit was reached. The first database update 422 provided by the database server 410 indicates the two entities that were updated, the remote database version number for the entities, and the updated values for the entities. In addition, the first update 422 specifies a remote database version number, 20, and a cursor, D. The remote database version number and cursor indicate, to the client device 402, that the first subset 420 of entities included in the first update 422 ended at entity D, and that each of the entities included in the first subset 420 are up to date as of remote database version number 20. When applying the first update 422 to the client database 406, the client device 402 may also store data indicating that the entities specified by keys A-D are up to date as of database version 20, even though the client version number for the database is 10. Note that the client version number for the client database 406 is not updated when updates have only been provided for a subset of database entries because other entities, e.g., entities specified by keys E-J, are still only up to date as of database version 10.

After receiving and applying the first update 422, the client device may send a second request 408b to the database server 410. The second request 408b includes an updated cursor indicating that the database server 410 should provide updates from entity D on, excluding entity D. The client database version number specified in the second request 408b is still version 10 because entities associated with keys E-J in the client database 406 are still only up to date as of database version 10.

The database server 410 begins checking for updates for a second subset 430 that begins with the entity following entity D, which is entity E. In the example process 400, the database server 410 makes it to entity G before a condition is met, and the database server 410 sends a second update 432 to the client device 402 with updates for entities E-G. Because changes have been made to the remote database 414 in between the first update 422 and the second update 432, the remote database version number has increased to version 24 as of the transmission of the second update 432. Entity G, for example, has been updated from version 20 to 21 between the first update 422 and second update 432.

Upon receipt of the second update 432, the client device 402 updates the entities included in the second subset 430 of the client database 406. When applying the second update 432 to the client database 406, the client device 402 may also store data indicating that the entities specified by keys E-G are up to date as of database version 24. At this point, entities A-D are still only up to date as of database version 20, and entities H-J are up to date as of database version 10.

After the third subset 440 has been updated, the process 400 may continue again from the first entity, and the process 400 may be repeated multiple times. In some implementations, subsets of entities may be dynamically adjusted. In other words, for a subsequent update in the example process 400, the database server 410 may only get through entities A-C before providing an update. In some situations, the database server 410 may get through all database entities in a single update. The subsets may dynamically adjust, for example, based on what the system constraints allow for any particular update request.

In some implementations, subsets may be merged. For example, the client device 402 may determine that two or more subsets of the client database 406 may be merged into a single subset if each subset is up to date as of the same remote database version number. In situations where two or more subsets are up to date as of different remote database version numbers, they may be merged so long as the lower remote database version number is used.

In some implementations, the database server 410 updates a change log, e.g., a three dimensional table, for the remote database 414. The change log stores each update to the remote database 414 for a predetermined period of time. Using a change log allows the database server 410 to handle queries for updates as of a particular database version number instead of only allowing queries for a current database version number. This may be used, for example, by a client device 402 that is creating a client database 406 that has all entities up to date as of the same database version number.

In the example process 400, the remote database 414 has an empty row depicting an entity that was deleted, entity F. In some implementations, deleted entities are not detected or accounted for during update requests, but are handled in separate requests for deleted entities. In some implementations, updates 416 may include an entity count for the entire remote database or a subset of the database. The entity count may be used to determine if entities have been deleted. The detection and handling of deleted entities are described in further detail with respect to FIGS. 6 and 7 below.

Figure 5:
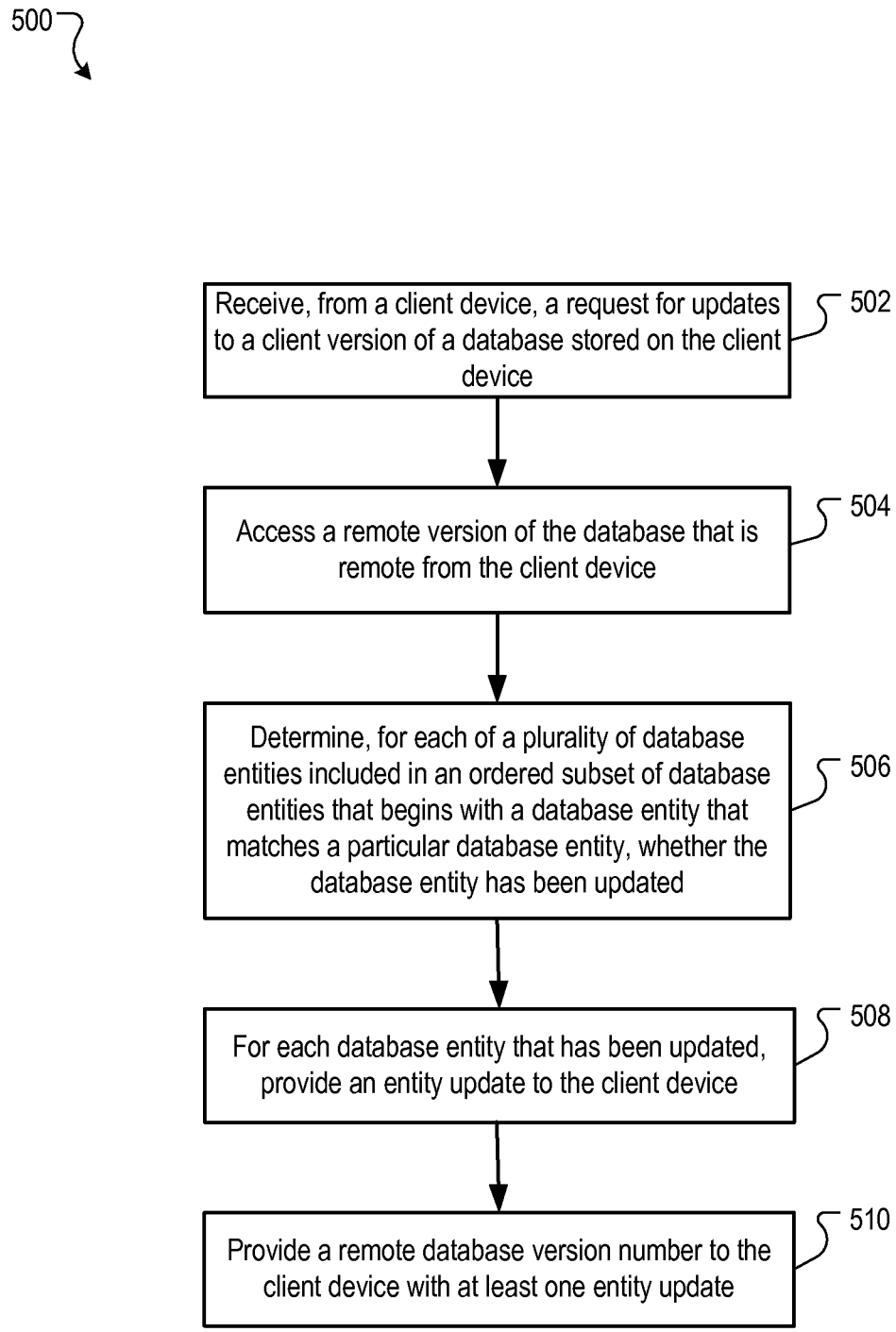
FIG. 5 is a flow diagram of an example process for synchronizing databases.

FIG. 5 is a flow diagram of an example process 500 for synchronizing databases. The process 500 may be performed by data processing apparatus, such as the database server described above with reference to FIG. 4.

A request is received, from a client device, for updates to a client version of a database stored on the client device (502). The request includes i) a client database version number for the client version of the database, and ii) a first cursor specifying a particular database entity included in the client version of the database. The client database version number may be, for example, the highest entity version number assigned to an entity in the client version of the database. The cursor may begin, for example, with the first entity in the database, and may be updated as the client device continues to send requests for updates.

A remote version of the database that is remote from the client device is accessed (504). The remote version of the database includes database entities, each database entity has a remote entity version number assigned in a monotonically increasing manner across the database entities for the database. For example, the remote version of the database may be a one of many storage devices used by a group of database servers for handling client device requests received over a network, such as the Internet. The monotonically increasing version numbers may be assigned, for example, using a database server timestamp or a continuously increasing integer value each time an entity is updated.

The process 500 determines, for each of a plurality of database entities included in an ordered subset of database entities that begins with a database entity that matches a particular database entity, whether the database entity has been updated (506). The determination is made based on a comparison of the remote entity version number of the database entity and the client database version number. For example, the database server may, starting at the entity specified by the cursor, go through the remote database entities in order, determining whether they have been updated or not. In situations where the remote entity version number is higher than the client database version number, the corresponding remote database entity has been updated. In situations where the remote entity version number is less than or matches the client database version number, the corresponding remote database entity has not been updated.

In some implementations, the subset of database entities does not include every database entity in the remote version of the database. For example, the subset may include only one database entity, half of the database entities, or all but one of the database entities. In some implementations, the subset of database entities is dynamically determined based on one or more system constraints being met. For example, system constraints may include a maximum processing time allowed for the request for updates, or a maximum update size allowed for the request for updates. Because each subset is dynamically determined, each one may be of a different size, and they may resize during repeated passes through the database.

For each database entity that has been updated, an entity update is provided to the client device (508). For example if a database entity has been updated, the database server may provide the client device with an updated value for the entity and an updated version number.

A remote database version number is provided to the client device with at least one entity update (510). For example, each update for a subset of database entities may include the remote database version number, which the client device may use to track which remote database version number the subset is updated to.

In some implementations, the process 500 includes receiving, from the client device, a second request for updates to the client version of the database, the second request including i) a second client database version number that matches the remote database version number that was provided to the client device with an entity update; and ii) a second cursor specifying a second database entity that is included in the client version of the database and that is ordered subsequent to a last database entity included in the ordered subset of database entities. The second cursor may specify, in some implementations, the last entity for which an update was provided. The database server may, for example, process the second update request in the same manner as the first update request, except that the starting position is specified by the cursor rather than starting at the first database entity. The process may repeat through all of the database entities and begin again after going through all of the database entities.

In some implementations, the process 500 includes updating a three dimensional table for the remote version of the database, the three dimensional table specifying every update to the remote version of the database that occurred within a predetermined period of time prior to a current time. For example, the three dimensional table, or change log, could store all of the changes to the database within the past 5 minutes, allowing requests to be sent to the database server "as of" a particular remote database version number. In other words, a client device could specify the same database version number for consecutive update requests, ensuring that the database will be consistent for that database version number when all updates have been provided by the database server.

Handling Deleted Database Entities

Figure 6:
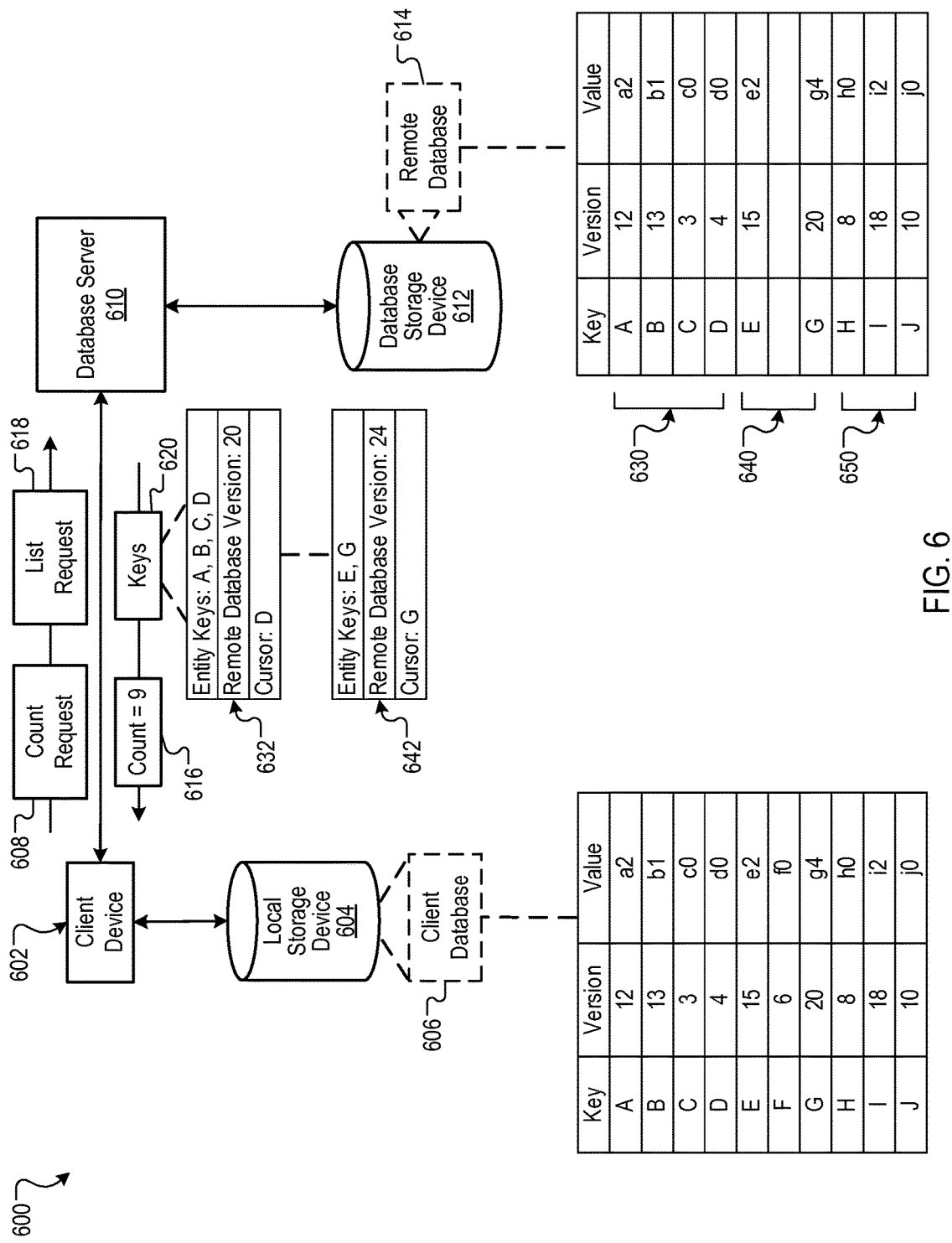
FIG. 6 is a data flow of an example process for detecting and handling deleted database entities.

FIG. 6 is a data flow of an example process 600 for detecting and handling deleted database entities. In some implementations, no delete markers are used by the database server 610 to indicate deletion of an entity. In addition, the database server 610 may not keep a change log for remote databases. To detect deleted entities, the client device 602 sends an entity count request 608 to the database server 610. In some implementations, the entity count request 608 is included in another request, e.g., with an update request, such as the request 408a discussed above with reference to FIG. 4. The request 608 may include a database version number indicating for which database version a count of entities is requested. The database server 610 receives the count request 608 and determines how many entities are included in the remote database 614 stored on the database storage device 612.

The database server 610 provides the client device with a count 616 of the entities in the remote database 614. In some implementations, a count may be provided with another response, e.g., with an update provided to the client device 602 during a synchronization operation, such as the update 416 discussed above with reference to FIG. 4. In the example process 600, the count 616 provided by the database server 610 indicates that 9 entities are stored in the remote database 614. Though the count is explicitly requested in the example process 600, there need not be an explicit request for an entity count sent from the client device 602. For example, the entity count may be sent with a response to database mutations and/or with updates sent during a synchronization operation.

The client device 602 compares the count 616 of entities in the remote database 614 to a local count of the entities stored in the client database 606 stored on the local storage device 604. In situations where the count 616 of entities in the remote database 614 matches the local count, the client device 602 need not check for deleted entities. In situations where the count 616 indicates fewer entities in the remote database 614 than in the client database 606, an entity has been deleted from the remote database 614 and delete has not been propagated to the client database 606.

In some implementations, a remote database version number is provided with the count 616. The client device 602 may use the remote database version number of a count and the client database version number to confirm that counts are being compared for the same database version number. If the database version numbers didn't match, the count provided by the database server may not be accurate for the client version of the database. To maintain consistency, counts may be compared for the same database version numbers.

In response to determining that the counts do not match, the client device 602 sends a list request 618 to the database server 610. The list request 618 is a request for a list of all the database keys for the entities stored in the remote database 614. The client device 602 may request keys instead of entities, for example, because keys are smaller than entities and are sufficient for detecting deletes because each key uniquely identifies a corresponding entity. In some implementations, the database server 610 provides, in response to the list request 618, a list of all keys for the entities included in the remote database 614, e.g., keys A-E and G-J.

The client device 602 may compare the keys included in the list to the keys in the client database 606 to find the entity or entities that were deleted from the remote database 614. Upon detecting a deleted entity, e.g., identifying a key that is included in the client database 606 but not in the list of keys, the client device 602 deletes the entity from the client database 606. As noted above, the entity count and list of keys may be for the same database version number and, in situations where the database version number matches the client database version number, this ensures that the deletes are properly detected as of a particular database version number.

In some implementations, the list of keys 620 provided by the database server 610 includes a proper subset of the keys included in the remote database 614. As with the synchronization process described in detail above with respect to FIGS. 4 and 5, list requests 618 and corresponding lists of keys provided in response may be handled in subsets, e.g., based the similar system constraints as those described above. In the example process 600, the first list of keys 632 is for a first subset 630 of the entities included in the remote database 614, e.g., keys for entities A-D. The example first response 632 also includes the remote database version number and a cursor indicating a logical position of the last entity of the first subset 630. In some implementations, an explicit cursor is not used, and the client device 602 may rely on the last key provided in a response as a cursor.

When the client device 602 receives the first response 632, it may determine whether the keys included in the first response 632 are also included in the client database 606. Any deleted entities detected can be removed from the client database 606. Following the processing of the first response 632, the client device may submit a second list request 618 requesting a list of the rest of the keys included in the remote database 614. The second request may include a cursor, e.g., specifying that the second request is for a list of the keys after entity D—the last entity for which a key was provided in the first response 632.

In the example process 600, the database server 610 provides a second response 642 for a second subset 640 of database entities. The second response 642 lists keys E and G, but not F, because F is the entity that was deleted from the remote database 614. The client device 602 determines, using the second response 642, that entity F was deleted because entity F is within the range of keys provided in the second response 642, but a key for entity F is not included in the second response 642, and entity F is included in the client database 606. The example process 600 may be repeated as long as there are deletes left to be detected and handled, e.g., as long as entity counts do not match between the client database 606 and remote database 614.

In implementations where the multiple ranges of keys are provided to the client device 602, each request and response for each range may be for the same database version number. This may ensure that, for a particular range of entities, the count and keys provided by the database server 610 are for the same database version as the corresponding range of entities on the client database. For example, the range of keys A-D are for database version 20; the client device may request a list of keys for the remaining entities, E-J, as of database version 20. In this situation, the database server 610 could access a short-term changelog, or three dimensional table, for the remote database 614 to obtain a list of keys as of database version 20. In some implementations, upon receipt of the second response 642 specifying database version 24, the client device may ensure that the client database version number is 24, or ensure that the range of keys, E-G, is at database version 24. If not, the client device can request updates to the entities E-G as of database version 24 before checking for deletes.

Figure 7:
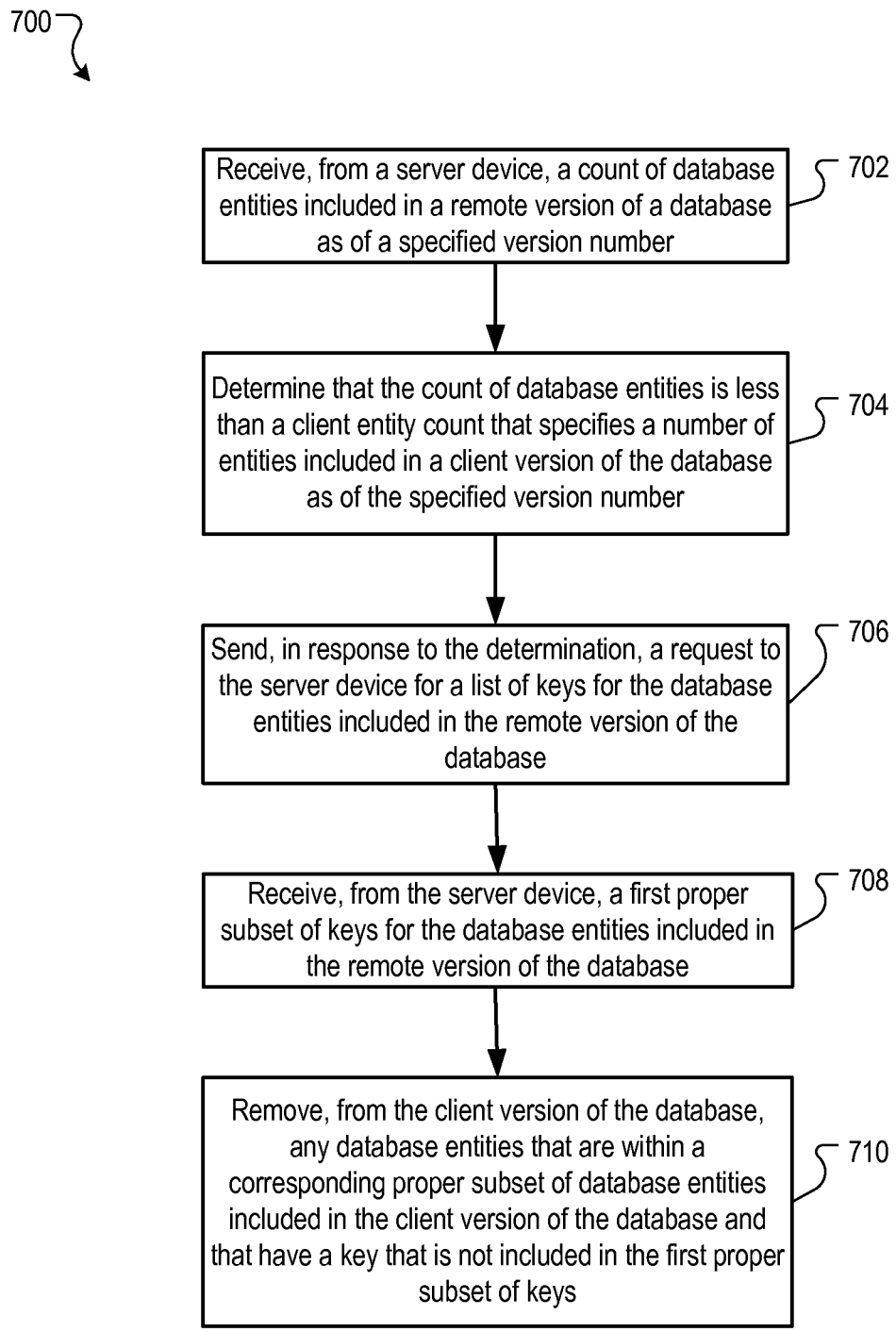
FIG. 7 is a flow diagram of an example process for detecting and handling deleted database entities.

FIG. 7 is a flow diagram of an example process 700 for detecting and handling deleted database entities. The process 700 may be performed by data processing apparatus, such as the client device and/or database server described above with reference to FIG. 6.

A count of database entities included in a remote version of a database as of a specified version number is received from a server device (702). For example, a count of database entities may specify that there are 90 database entities stored in the remote version of a database as of database version 300.

The process 700 determines that the count of database entities is less than a client entity count that specifies a number of entities included in a client version of the database as of the specified version number (704). For example, a client device may determine that the client version of the database only include 85 database entities as of database version 300, which indicates that 5 database entities were deleted on the remote version of the database.

In response to determining that the count of database entities is less than a client entity count, a request is sent to the server device for a list of keys for the database entities included in the remote version of the database (706). In some implementations, the request may include a cursor specifying the last database entity for which the client device has information regarding deletion of entities. A request that does not include a cursor may start, for example, at the first database entity.

A first proper subset of keys for a proper subset of the database entities included in the remote version of the database is received from the server device (708). For example, the server device may have provided a list of keys for the first 30 database entities of the 85 total database entities. The number of keys included in the subset may depend on server constraints, such as those described above with reference to FIGS. 4 and 5.

Any database entities that are within a corresponding proper subset of database entities included in the client version of the database and that have a key that is not included in the first proper subset of keys are removed from the client version of the database (710). For example, in a situation where the client version of the database includes two database entities within a range specified by the first subset but that have keys that are not within the first subset of keys for the 30 database entities provided by the server device, those two database entities may be removed from the client version of the database, e.g., treated as deleted entities because they no longer exist on the remote version of the database.

In some implementations, the process 700 further includes sending, to the server device, a second request for a second count of database entities included in a second subset of database entities that is different from the first subset of database entities, the second request specifying a second version number of the database. The second subset may be, for example, all entities not included in the first subset, e.g., database entities 31 through 90, which may specified by a cursor sent in a count request specifying the 30th (excluding the 30th) or 31st (including the 31st) entity as a starting point.

In some implementations, the process 700 may include receiving, from the server device, the second count of database entities included in a corresponding second subset of database entities included in the remote version of the database as of the second version number; determining that the second count of database entities is less than a second client entity count that specifies a second number of entities included in the second subset of database entities client version of the database as of the second version number; and sending, to the server device, a second request for a second list of keys for the database entities included in the second subset. The second count may not be necessary, e.g., in the foregoing example, the deletion of five entities was detected based on the first count and only two of the deleted entities have been identified, which leaves three deleted entities left to be detected. However, in situations where database version numbers are changed between requests, a new count may need to be requested for the second subset to discover any new deletes that may have occurred within the second subset between the requests. In some implementations, a three dimensional table of short term changes, e.g., a short term change log, may be used to handle delete detection for the entire database as of a particular database version number.

In some implementations, the process 700 may include receiving, from the server device, a third subset of keys for a third subset of the database entities included in the remote version of the database. As the database server may not be able to read every key in the remote database within certain system constraints, e.g., time or response size, the subset of keys returned by the database server may again be less than the remaining keys in the database, e.g., the list may include keys for the 31st through 65th database entities.

In some implementations, the process 700 may include removing, from the client version of the database, any database entities that are within a subset of database entities included in the client version of the database that corresponds to the third subset and that have a key that is not included in the third subset of keys. For example, if three entities in a corresponding subset have keys not included in the third subset of keys, those three entities may be deleted from the client version of the database. In the foregoing example, the process 700 may end without requesting keys for the remainder of the database, e.g., because all five deletes have been identified.

Portions of the process 700 may repeat. For example, the client device may request and receive, for multiple ranges of database entities, lists of database entities that are included in the remote database server; and those lists may be used to remove deleted entities from the client version of the database. The process 700 may continue, in some implementations, to send requests for lists of entities, e.g., until a count of client database entities matches a count of remote database entities. If counts still do not match up after going through the database a first time, e.g., in a situation where another entity is deleted while deletes are being updated, the process may continue from the beginning.

In some implementations, each of the processes described separately above, e.g., with respect to FIGS. 3A, 3B, 5, and 7, may be combined, in whole or in part, with the other processes. For example, a request for updates may be provided along with a request for updates, and a request for updates may include a request for a count or list of entities. A response to an update request may include a list of the entities included in the response, both updated and non-updated, allowing the client device to check for deleted entities without the need for a separate request and response. Other configurations of requests and responses may be used to perform the processes described above.

Example Data Processing Apparatus

Figure 8:
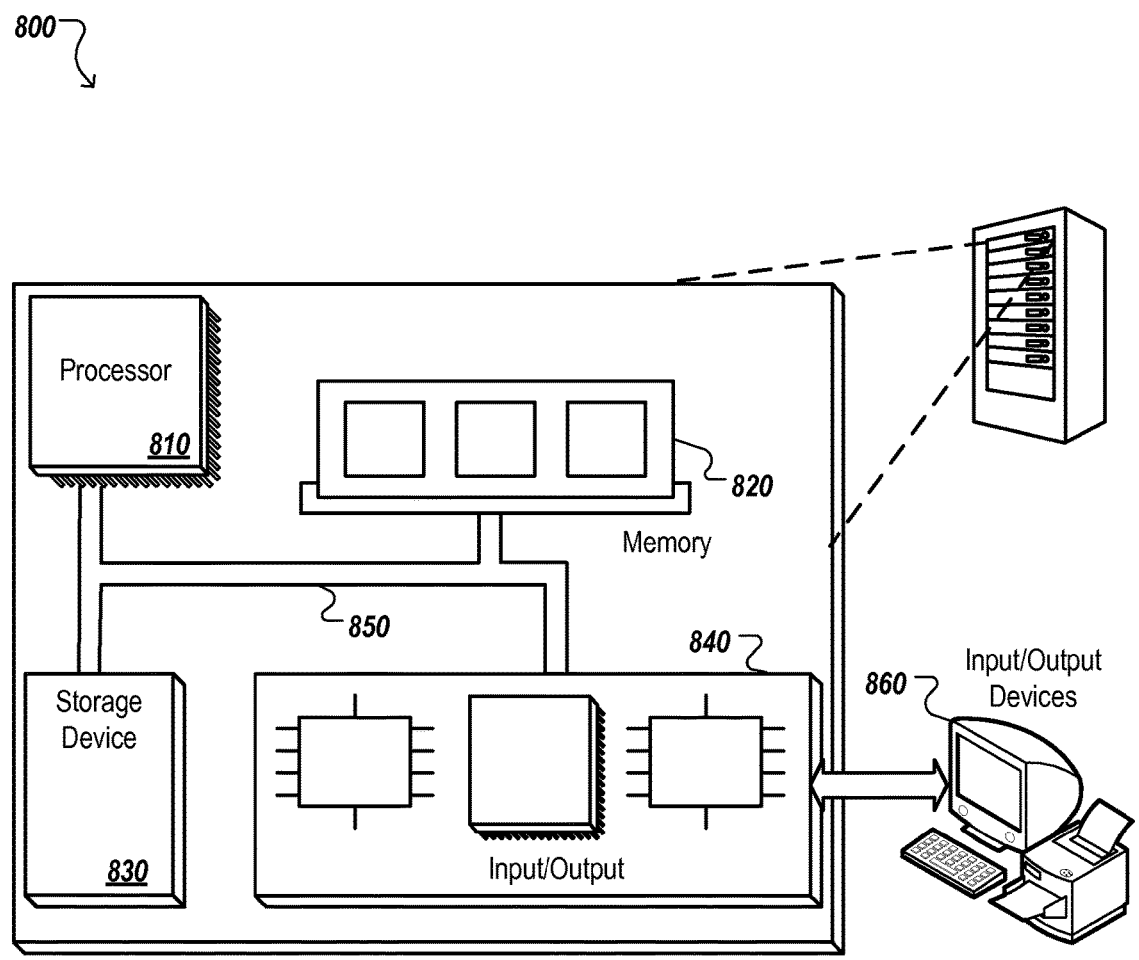
FIG. 8 is a block diagram of an example data processing apparatus.

FIG. 8 is a block diagram of an example data processing apparatus 800. The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more data processing apparatus, the method comprising:
    receiving, by a server, a log of database mutations from a single client device, the log of database mutations indicating changes previously made to a client version of a database stored on the single client device, and each database mutation specifying:
        an entity included in the database, where the entity includes a row or record in the database;
        an operation for the entity; and
        a client version number for the entity;
    identifying, in the log of database mutations and by the server, two or more database mutations that each specify a same client version number for a same entity and specify a different operation that was performed on the single client device for the same entity;
    determining, by the server and based on a conflict resolution policy that describes a policy for resolving a conflict in the entity between the single client device and the server, that a conflict between the single client device and the server for a first database mutation of the two or more database mutations resolves in favor of the client device over the server; and
    in response to determining the conflict between the single client device and the server for the first database mutation of the two or more database mutations resolves in favor of the client device over the server, collapsing the first database mutation and a second database mutation of the two or more database mutations, that specifies setting a value of the entity to a different value than the first database mutation specifies, into a single database mutation that specifies a single operation that sets the value of the entity to the different value,
    wherein a conflict between the second database mutation and the server resolves in favor of the client device because both the first database mutation occurred before the second database mutation and the conflict between first database mutation and the server resolves in favor of the client device.

2. The method of claim 1, wherein determining, by the server and based on a conflict resolution policy that describes a policy for resolving a conflict in the entity between the single client device and the server, that a conflict between the single client device and the server for a first database mutation of the two or more database mutations resolves in favor of the client device over the server comprises:
    identifying a first database mutations of the two or more database mutations that, based on the conflict resolution policy, would be applied to a remote database.

3. The method of claim 2, wherein collapsing the first database mutation and the second database mutation comprises:
    collapsing the first database mutation and each other database mutation of the two or more database mutations that occurs subsequent to the first database mutation into the single database mutation.

4. The method of claim 3, wherein collapsing the first database mutation and each other database mutation into the single database mutation that specifies the single operation comprises collapsing, into the single database mutation, a most recent database mutation from the two or more database mutations.

5. The method of claim 1, wherein each of the two or more database mutations specify the conflict resolution policy.

6. The method of claim 1, further comprising:
    for the single database mutation and for each other database mutation included in the log:
        querying a remote version of the database to identify a base version number for the entity specified by the mutation;
        determining whether the client version number for the entity matches the base version number for the entity;
        in response to determining that the client version number matches the base version number:
            performing, for the remote version of the database, the operation specified by the mutation;
            generating response data for the single client device, the response data including an updated base version number for the entity; and
        in response to determining that the client version number does not match the base version number:
            determining, based on a conflict resolution policy, whether the operation specified by the mutation will be performed;
            performing, for the remote version of the database, the operation specified by the mutation only if it is determined that the operation specified by the mutation will be performed; and
            generating conflict response data for the single client device, the conflict response data specifying whether the operation specified by the mutation was performed.

7. The method of claim 6, wherein the conflict response data for the single client device includes, for the entity specified by the mutation, a current version for the entity stored in the remote version of the database.

8. A system comprising:
one or more data processing apparatus; and
a data store storing instructions that, when executed by the one or more data processing apparatus, cause the one or more data processing apparatus to perform operations comprising:
receiving, by a server, a log of database mutations from a single client device, the log of database mutations indicating changes previously made to a client version of a database stored on the single client device, and each database mutation specifying:
an entity included in the database, where the entity includes a row or record in the database;
an operation for the entity; and
a client version number for the entity;
identifying, in the log of database mutations and by the server, two or more database mutations that each specify a same client version number for a same entity and specify a different operation that was performed on the single client device for the same entity;
determining, by the server and based on a conflict resolution policy that describes a policy for resolving a conflict in the entity between the single client device and the server, that a conflict between the single client device and the server for a first database mutation of the two or more database mutations resolves in favor of the client device over the server; and
in response to determining the conflict between the single client device and the server for the first database mutation of the two or more database mutations resolves in favor of the client device over the server, collapsing the first database mutation and a second database mutation of the two or more database mutations, that specifies setting a value of the entity to a different value than the first database mutation specifies, into a single database mutation that specifies a single operation that sets the value of the entity to the different value,
wherein a conflict between the second database mutation and the server resolves in favor of the client device because both the first database mutation occurred before the second database mutation and the conflict between first database mutation and the server resolves in favor of the client device.

9. The system of claim 8, wherein determining, by the server and based on a conflict resolution policy that describes a policy for resolving a conflict in the entity between the single client device and the server, that a conflict between the single client device and the server for a first database mutation of the two or more database mutations resolves in favor of the client device over the server comprises:
identifying a first database mutations of the two or more database mutations that, based on the conflict resolution policy, would be applied to a remote database.

10. The system of claim 9, wherein collapsing the first database mutation and the second database mutation comprises:
collapsing the first database mutation and each other database mutation of the two or more database mutations that occurs subsequent to the first database mutation into the single database mutation.

11. The system of claim 10, wherein collapsing the first database mutation and each other database mutation into the single database mutation that specifies the single operation comprises collapsing, into the single database mutation, a most recent database mutation from the two or more database mutations.

12. The system of claim 8, wherein each of the two or more database mutations specify the conflict resolution policy.

13. The system of claim 8, wherein the operations further comprise:
for the single database mutation and for each other database mutation included in the log:
querying a remote version of the database to identify a base version number for the entity specified by the mutation;
determining whether the client version number for the entity matches the base version number for the entity;
in response to determining that the client version number matches the base version number:
performing, for the remote version of the database, the operation specified by the mutation;
generating response data for the single client device, the response data including an updated base version number for the entity; and
in response to determining that the client version number does not match the base version number:
determining, based on a conflict resolution policy, whether the operation specified by the mutation will be performed;
performing, for the remote version of the database, the operation specified by the mutation only if it is determined that the operation specified by the mutation will be performed; and
generating conflict response data for the single client device, the conflict response data specifying whether the operation specified by the mutation was performed.

14. The system of claim 13, wherein the conflict response data for the single client device includes, for the entity specified by the mutation, a current version for the entity stored in the remote version of the database.

15. A non-transitory computer readable medium storing instructions that, when executed by one or more data processing apparatus, cause the one or more data processing apparatus to perform operations comprising:
receiving, by a server, a log of database mutations from a single client device, the log of database mutations indicating changes previously made to a client version of a database stored on the single client device, and each database mutation specifying:
an entity included in the database, where the entity includes a row or record in the database;
an operation for the entity; and
a client version number for the entity;
identifying, in the log of database mutations and by the server, two or more database mutations that each specify a same client version number for a same entity and specify a different operation that was performed on the single client device for the same entity;
determining, by the server and based on a conflict resolution policy that describes a policy for resolving a conflict in the entity between the single client device and the server, that a conflict between the single client device and the server for a first database mutation of the two or more database mutations resolves in favor of the client device over the server; and
in response to determining the conflict between the single client device and the server for the first database mutation of the two or more database mutations resolves in favor of the client device over the server, collapsing the first database mutation and a second database mutation of the two or more database mutations, that specifies setting a value of the entity to a different value than the first database mutation specifies, into a single database mutation that specifies a single operation that sets the value of the entity to the different value, wherein a conflict between the second database mutation and the server resolves in favor of the client device because both the first database mutation occurred before the second database mutation and the conflict between first database mutation and the server resolves in favor of the client device.

16. The computer readable medium of claim 15, wherein determining, by the server and based on a conflict resolution policy that describes a policy for resolving a conflict in the entity between the client device and the server, that a conflict between the single client device and the server for a first database mutation of the two or more database mutations resolves in favor of the client device over the server comprises:

identifying a first database mutations of the two or more database mutations that, based on the conflict resolution policy, would be applied to a remote database.

17. The computer readable medium of claim 16, wherein collapsing the first database mutation and the second database mutation comprises:

collapsing the first database mutation and each other database mutation of the two or more database mutations that occurs subsequent to the first database mutation into the single database mutation.

18. The computer readable medium of claim 17, wherein collapsing the first database mutation and each other database mutation into the single database mutation that specifies the single operation comprises collapsing, into the single database mutation, a most recent database mutation from the two or more database mutations.

\* \* \* \* \*